United States Patent [19]
Gartner

[11] 3,789,678
[45] Feb. 5, 1974

[54] SCREW DRIVE MEANS USING AUXILIARY MESHING ROLLERS

[76] Inventor: Robert Gartner, Freherr von Stein Strasse 8, Butzbach/Hessen, Germany

[22] Filed: July 26, 1972

[21] Appl. No.: 275,146

[30] Foreign Application Priority Data
July 28, 1971 Germany............. P 21 37 636.3

[52] U.S. Cl............................. 74/89, 74/459, 74/25
[51] Int. Cl............................................. F16h 27/02
[58] Field of Search........................... 74/89, 25, 459

[56] References Cited
UNITED STATES PATENTS

| | | | |
|---|---|---|---|
| 2,940,322 | 6/1960 | Uhing | 74/25 |
| 3,004,445 | 10/1961 | Mondon | 74/459 |
| 3,434,357 | 3/1969 | Roantree | 74/25 |

Primary Examiner—Charles J. Myhre
Assistant Examiner—Wesley S. Ratliff, Jr.
Attorney, Agent, or Firm—James M. Heilman; William O. Heilman

[57] ABSTRACT

A means for mechanically moving a spindle in a longitudinal direction by operating one or a plurality of meshing rollers positioned around the spindle axis. In one form the spindle is formed with annular grooves and the rollers are threaded. In a second form the spindle is threaded and the rollers are formed with annular grooves. Since the rollers are free to rotate, this type of transmission has less friction than the usual bolt and nut combination.

9 Claims, 7 Drawing Figures

Patented Feb. 5, 1974

SCREW DRIVE MEANS USING AUXILIARY MESHING ROLLERS

The invention relates to a screw drive having two transmission members which engage in one another and of which at least one may be set in rotational motion.

The underlying aim of the invention is to increase the efficiency of screw drives of this type with the aid of simple means, while reducing wearing of the corresponding parts.

For the purpose of achieving this aim, the invention provides, in the case of a screw drive of the type mentioned, that one of the two transmission members is formed with parallel grooves, the second transmission member carries a thread, and the axes, which are offset laterally in relation to one another, of the two transmission members, extend parallel to one another.

In this arrangement, the lifting spindle of the drive, as one transmission member, is meshed with the annular grooves. In this form of construction, the second transmission member is constructed as a rolling annular nut, which surrounds the spindle having the parallel annular grooves.

A specific rotational speed ratio between the two transmission members may be produced with the aid of gears, chain-wheels or the like. This rotational speed ratio may be varied with the aid of a number of transmission stages and free-wheeling arrangements, while non-rotation of one transmission member is also possible, for example in the event of return motion without any load.

Further features of the invention emerge from the following description in conjunction with the drawings. The latter illustrates examples of construction of the screw drive according to the invention.

Figure 1:
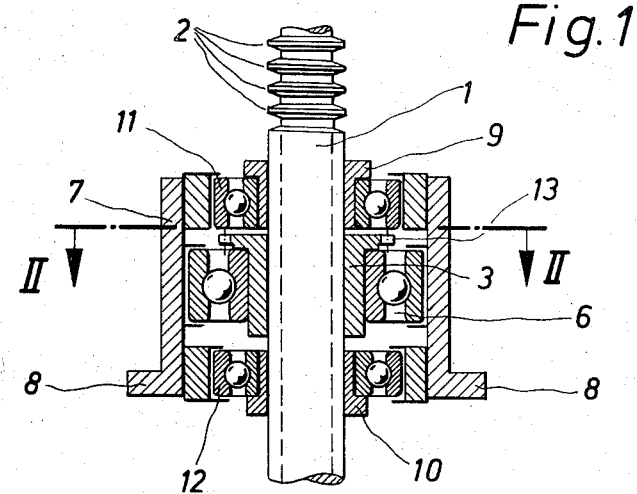
FIG. 1 shows a diagrammatic vertical section through one form of construction.

FIGS. 4, 5, 6, and 7 show further examples of construction of the screw drive according to the invention.

In the drawings, the lifting member is provided with a spindle 1 which, instead of the thread course otherwise customary, carries parallel trapezium-shaped circular grooves 2 over its entire functional length. The spindle 1 is surrounded by a threaded, rolling annular nut 3, the axis 4 of which is located parallel to the axis 1a of the spindle 1. In its bore, the threaded, rolling annular nut 3 carries an internal thread, the pitch of which is equal to the distance between the grooves 2. The profile of the thread course is matched to that of the grooves in such a way as to produce favorable engagement and load-bearing conditions. The threaded rolling annular nut 3, the thread diameter of which is greater, in the construction illustrated, than the diameter of the circular grooves in the spindle 1, engages on one side in the spindle 1 with the result that carrier zones are produced which, viewed in cross-section, are crescent-shaped between the spindle and the threaded rolling annular nut, and the number of which corresponds to the number of thread courses in the threaded, rolling annular nut. A crescent-shaped carrier zone of this kind is illustrated in shaded form in FIG. 2 and provided with the reference numeral 5. The transmission of force between the spindle 1 and the threaded, rolling annular nut 3 takes place within this crescent-shaped carrier zone 5.

For the purpose of guiding and supporting the threaded, rolling annular nut 3, the latter is connected to the inner ring of a rolling bearing 6. The outer ring of this rolling bearing is connected to the casing 7. For the purpose of supporting the threaded, rolling annular nut, a number of rolling bearings of different design, such as cam rollers and supporting rollers may be used, one behind the other in any desired number and combination, instead of the rolling bearing 6 illustrated.

In the example of application illustrated, in which the spindle 1 moves upwards or downwards when the rolling annular nut 3 is rotated, the casing 7 rests, with the aid of the flanges 8, on a fixed support (not shown). The spindle 1 is guided in the casing by the bushings 9, 10, which are connected to the inner rings of rolling bearings 11, 12. The outer rings of these rolling bearings are connected to the casing 7 (FIG. 3).

The rolling annular nut 3 which engages in the grooves in the spindle 1, is constructed as a gear 13 at its upper end. This gear 13, and therefore the threaded, rolling annular nut 3, are driven by the gear 14. If, under these circumstances, the threaded, rolling annular nut 3 mounted in the casing rotates once about its axis 4, the spindle 1 is raised or lowered by one thread or by one groove interval on the spindle 1. Since the spindle 1 rotates at the same time, the movement which occurs is, to a great extent, non-slipping, and also exhibits little friction and wear (high efficiency). The size of the stroke of the spindle 1 is independent of the rotational slipping between the threaded rolling annular nut 3 and the spindle 1.

Figure 2:
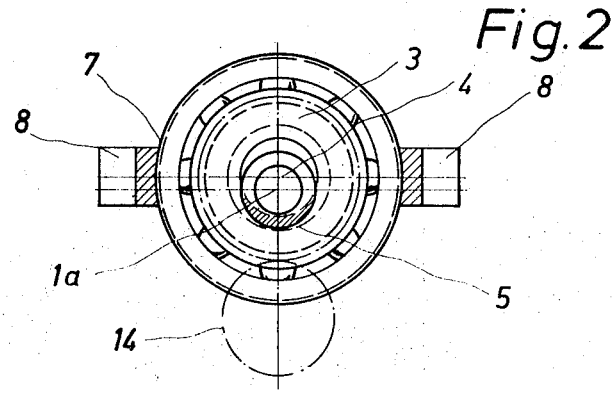
FIG. 2 is a section along the line II—II in FIG. 1.
Figure 3:
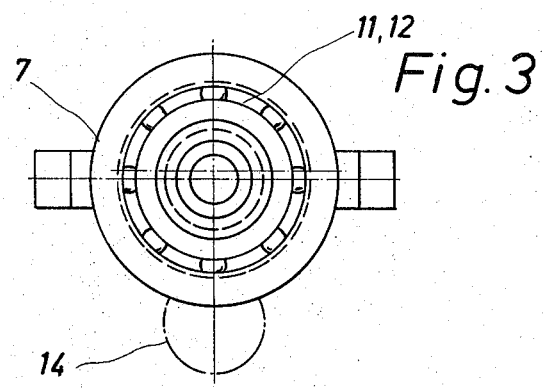
FIG. 3 is a plan view of this form of construction.

The gear drive 14 illustrated in FIGS. 2 and 3 for the threaded, rolling annular nut 3 may be replaced by a drive of a different type such as, for example, a worm drive, chain drive or toothed belt drive.

During its stroke, the spindle 1, which rotates about its axis in the course of the stroke, is guided in the bushings 9, 10. Because they are mounted in the rolling bearings 11, 12, the bushings rotate with the spindle. The only relative sliding action which occurs between the bushings and the spindle 1 is the stroke movement, and because of this the efficiency of the drive is increased and wearing of the latter is reduced.

If, for technical reasons, it is desired to eliminate the rotational movement of the spindle 1 during the stroke, it is possible to impose an additional rotation which is equal to the negative rotational speed of the spindle 1. Then, the spindle 1 no longer turns. It is also possible to dispose two or more threaded, rolling annular nuts above one another, in a symmetrically or asymmetrically offset manner.

The mutually matched profile shapes of the thread in the rolling annular nut and of the grooves in the spindle may be of any desired kind, whether symmetrical or asymmetrical.

Figure 4:
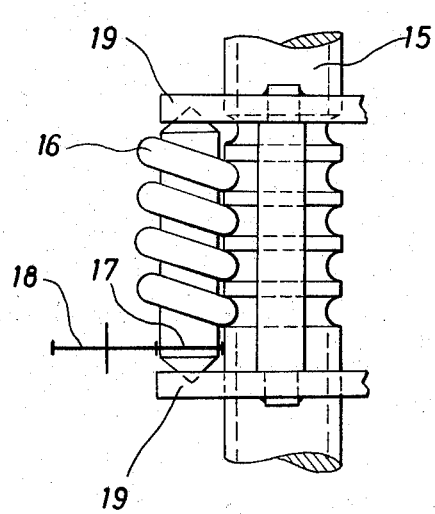

FIG. 4 shows an arrangement in which the spindle 15, having parallel annular grooves, is located beside a threaded roller 16. A plurality of threaded rollers 16, of which only one is illustrated, may be mounted around the spindle 15, and all are driven by the gear drive 17, 18, as the spindle 15, which may also rotate, is raised or lowered. The stroke of the spindle is independent of slipping. The plurality of threaded rollers 16, which are preferably disposed symmetrically around the spindle, are mounted in the frame 19 which also performs the function of guiding the spindle.

Figure 5:
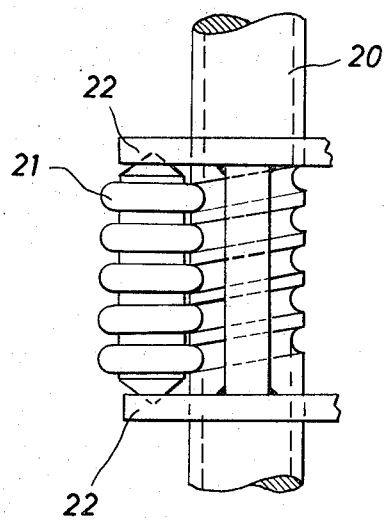

In the form of construction shown in FIG. 5, the threaded spindle 20 carries a thread and is surrounded by supporting rollers 21 having annular grooves (only one roller being shown). Again, these rollers are mounted in the frame 22 which also guides the threaded spindle.

Figure 6:
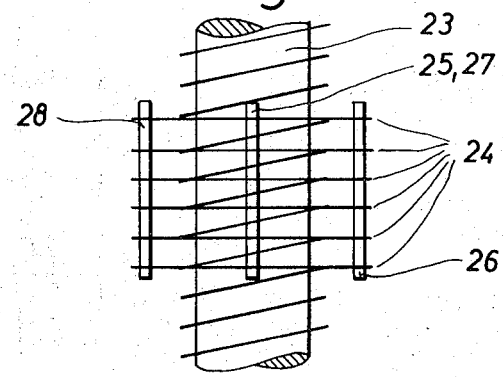
Figure 7:
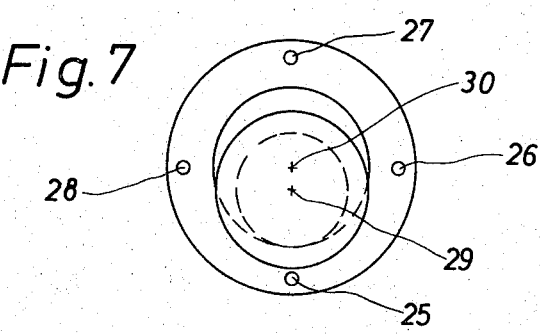

FIGS. 6 and 7 show diagrammatically how there engages, in the threaded spindle 23, a system of rolling rings 24 which are located perpendicularly to the longitudinal axis and are joined together by the axially parallel vertical bolts 25, 26, 27, 28.

The axis of the threaded spindle is designated by 29 and that of the system of rolling rings by 30.

I claim:

1. A screw drive means comprising a spindle arranged for longitudinal movement, said spindle formed with spaced annular grooves on its surface; a nut surrounding the spindle and mounted for rotation about an axis which is offset from but parallel to the spindle axis, said nut formed with internal helical threads which partially mesh with said spaced annular grooves; and operating means coupled to the nut for rotating it about its axis to move the spindle longitudinally.

2. A screw drive means according to claim 1 wherein the axis of the spindle and the axis of the threaded portion of the nut are parallel to each other.

3. A screw drive means according to claim 1 wherein said nut is formed with a flange having gear teeth for coupling with said operating means.

4. A screw drive means according to claim 1 wherein said spindle is mounted on two ball bearings spaced from each other and the nut is mounted on another ball bearing mounted between the bearings which support the spindle.

5. A screw drive according to claim 1 wherein the rotational speed of nuts can be varied from outside and a variable lifting speed can be achieved.

6. A screw drive means according to claim 1 wherein said nuts are driven.

7. A screw drive means with interengaging transmission members defining crescent-shaped support zones comprising a spindle and at least one part carrying threads and arranged with its longitudinal axis juxtaposed to the longitudinal axis of the spindle, the laterally offset axes of both parts extending parallel to one another and one of the parts being rotatable, characterized in that the part arranged with its longitudinal axis juxtaposed to the spindle axis is formed as a roller ring nut eccentrically surrounding the spindle.

8. A screw drive according to claim 7, wherein the spindle is provided with parallel grooves.

9. A screw drive according to claim 7 wherein a plurality of external coupling means provides a specific rotary speed relationship between said two transmission members.

* * * * *